United States Patent
Charles et al.

(10) Patent No.: US 11,305,328 B2
(45) Date of Patent: Apr. 19, 2022

(54) BLANKING DIE APPARATUSES WITH INFEED ASSEMBLIES

(71) Applicant: Toyota Motor Engineering & Manufacturing North America, Inc., Plano, TX (US)

(72) Inventors: Thoney R. Charles, Georgetown, KY (US); George A. Weiss, Lexington, KY (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 96 days.

(21) Appl. No.: 16/454,270

(22) Filed: Jun. 27, 2019

(65) Prior Publication Data
US 2020/0406334 A1     Dec. 31, 2020

(51) Int. Cl.
*B21D 43/28* (2006.01)
*B21D 28/26* (2006.01)
*B21D 37/10* (2006.01)
*B23D 33/02* (2006.01)

(52) U.S. Cl.
CPC .......... *B21D 43/287* (2013.01); *B21D 28/26* (2013.01); *B21D 37/10* (2013.01); *B23D 33/02* (2013.01)

(58) Field of Classification Search
CPC ...... B21D 43/287; B21D 28/26; B21D 28/02; B21D 37/10; B21D 43/28; B23D 33/02; B21C 47/18
USPC ............... 83/176, 30, 40, 55, 613, 202, 165; 72/169; 100/94–98 A
See application file for complete search history.

(56) References Cited

U.S. PATENT DOCUMENTS

| | | | |
|---|---|---|---|
| 2,126,478 A * | 8/1938 | Landrock | B26D 1/095 83/373 |
| 2,231,400 A * | 2/1941 | Washburn | B21C 47/08 72/146 |
| 3,333,446 A | 8/1967 | Laffie | |
| 3,974,949 A * | 8/1976 | Petersen | B21D 37/18 226/42 |
| 4,510,841 A * | 4/1985 | Farran | B26D 1/305 83/176 |
| 5,087,849 A * | 2/1992 | Neuenschwander | B21D 28/22 310/216.013 |
| 6,688,198 B2 | 2/2004 | Matsumoto et al. | |
| 7,293,592 B1* | 11/2007 | Golicz | B65C 9/1896 156/156 |
| 7,600,312 B2* | 10/2009 | Lee | B21D 35/00 29/609 |

(Continued)

FOREIGN PATENT DOCUMENTS

CN     107876862     4/2018
WO     2014201490     12/2014

*Primary Examiner* — Nhat Chieu Q Do
(74) *Attorney, Agent, or Firm* — Dinsmore & Shohl LLP

(57) ABSTRACT

A blanking die apparatus includes a first blanking die including an upper die shoe including an upper die shoe cutting surface and a lower die shoe including a lower die shoe cutting surface. A second blanking die including an upper die shoe including an upper die shoe cutting surface and a lower die shoe including a lower die shoe cutting surface. An infeed assembly that is configured to form a continuous strip of a metal sheet into a non-planar, arc-shape as the continuous strip of metal sheet enters the first blanking die.

5 Claims, 4 Drawing Sheets

(56) References Cited

U.S. PATENT DOCUMENTS

| | | | | |
|---|---|---|---|---|
| 2007/0204667 A1* | 9/2007 | Ho | ................. | B21D 43/11 |
| | | | | 72/169 |
| 2012/0205083 A1* | 8/2012 | Bergmiller | ............ | B21D 37/08 |
| | | | | 165/173 |
| 2017/0120319 A1* | 5/2017 | Cheung | ................. | B21D 28/26 |
| 2017/0334086 A1* | 11/2017 | Cheung | ................. | B21D 28/00 |

* cited by examiner

BLANKING DIE APPARATUSES WITH INFEED ASSEMBLIES

TECHNICAL FIELD

The present specification generally relates to blanking dies, and more specifically, blanking dies apparatuses that include infeed assemblies that impart a non-planar shape to a metal sheet material as the metal sheet material is fed to the blanking die apparatuses.

BACKGROUND

Straight blanks may be cut using a single die that cuts one blank per stroke. The blanks may then be shaped, for example, in a stamping process into a stamped part. There are also blanking dies that can form two blanks in one stroke. Often, the straight blanks are formed from a metal sheet material that is wound into a coil and delivered to the die in portions for blanking operations. Blanking dies are useful for their reliability and repeatability to form blanks of particular dimensions.

As can be appreciated, the metal sheet material may be thin and flexible. Accordingly, various sheet transfer devices, such as rollers and gauges may be needed to guide the metal sheet material so that the metal sheet material does not bend out of a feed direction due to gravity.

Accordingly, a need exists for blanking die apparatuses that cut multiple blanks in a single stroke with infeed assemblies that can impart a non-planar shape to the metal sheet material as the metal sheet material is fed to the blanking die apparatuses.

SUMMARY

In one embodiment, a blanking die apparatus includes a first blanking die including an upper die shoe including an upper die shoe cutting surface and a lower die shoe including a lower die shoe cutting surface. A second blanking die including an upper die shoe including an upper die shoe cutting surface and a lower die shoe including a lower die shoe cutting surface. An infeed assembly that is configured to form a continuous strip of a metal sheet into a non-planar, arc-shape as the continuous strip of metal sheet enters the first blanking die.

In another embodiment, a method of forming a blank using a blanking die apparatus is provided. The method includes forcing a continuous strip of a metal sheet used to form the first metal blank and the second metal blank into an arc-shape. The continuous strip of the metal sheet is fed in the arc-shape to a first blanking die. The continuous strip of the metal sheet is fed in the arc-shape to a second blanking die that is spaced from the first blanking die. A first metal blank is cut using both the first blanking die and the second blanking die. A second metal blank is cut using the second blanking die as the first metal blank is cut.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to embodiments described herein, blanking die apparatuses are described that cut multiple blanks in a single stroke that can cut blanks of different dimensions without changing positions of blank cutters themselves on a particular blanking die. The blanking die apparatuses generally include a delivery mechanism that delivers a continuous strip of a metal sheet material from a roll to a first blanking die and then to a second blanking die. The blanking dies may be operated together to cut two blanks from the strip of the metal sheet material. The blanks may be of substantially the same dimensions or they may be different dimensions. To change a dimension of one or both of the blanks, the second blanking die that is downstream of the first blanking die may be moved in a feed direction toward or away from the first blanking die, which changes the dimension of the blank formed between the first and second dies. The second blanking die may then be locked into place using a locking mechanism for a blanking process.

Changing the dimension of the blanks also increases a distance between the first blanking die and the second blanking die, which can increase an opportunity for the metal sheet material to bend when being delivered between the first and second blanking dies, if unsupported. To this end, an infeed assembly is provided that can impart a non-planar, arc-shape to the metal sheet material as the metal sheet material is fed to the first blanking die. The first and second blanking dies may also include cutting surfaces that have a same arc-shape to help maintain the arc of the metal sheet material throughout the blanking process. Imparting an arc-shape to the metal sheet material in cross-section can provide increased support and resistance to bending and reduce any need for additional support as the metal sheet material moves from the first blanking die to the second blanking die.

Figure 1:
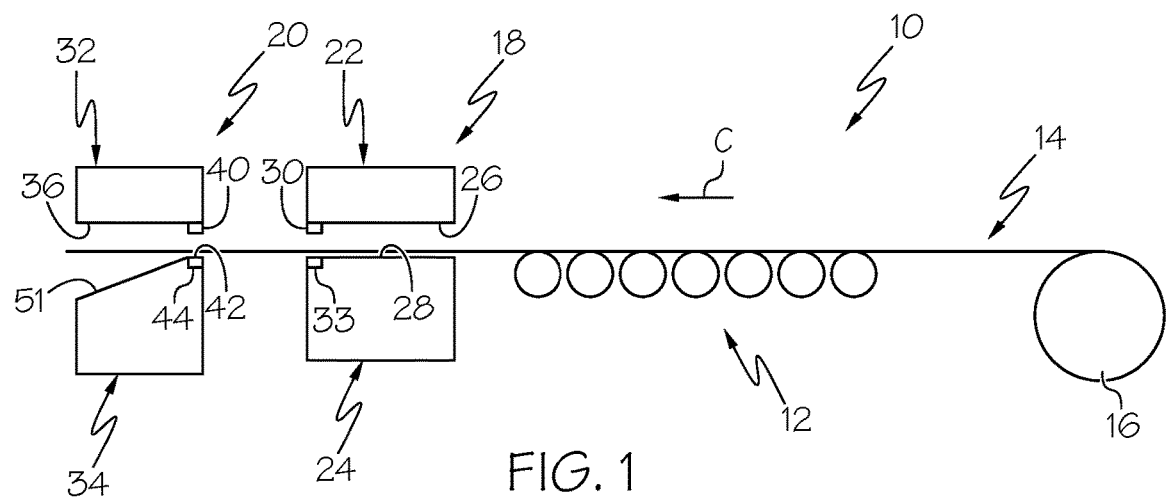
FIG. 1 is a schematic illustration of a blanking die apparatus, according to one or more embodiments shown and described herein.
Figure 2:
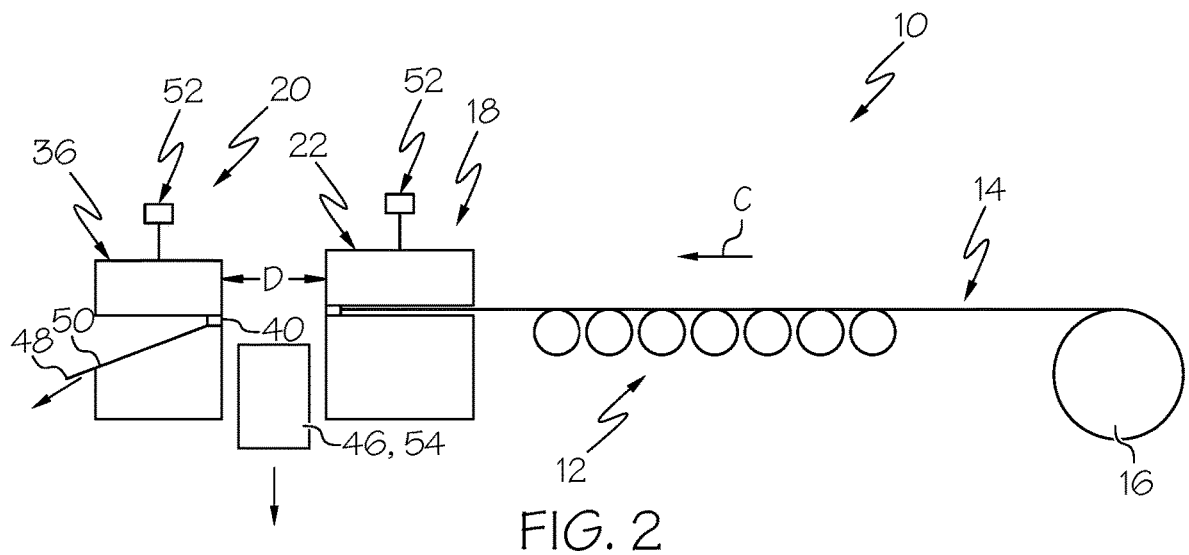
FIG. 2 is another schematic illustration of the blanking die apparatus of FIG. 1, according to one or more embodiments shown and described herein.

Referring to FIGS. 1 and 2, a blanking die apparatus 10 is illustrated schematically that includes a delivery mechanism 12 that delivers a continuous strip 14 of a metal sheet material from a roll 16 to a first blanking die 18 and then to a second blanking die 20 that is located downstream of the first blanking die 18 in a feed direction C. The first blanking die 18 includes an upper die shoe 22 and a lower die shoe 24. The upper die shoe 22 includes an upper die shoe cutting surface 26 with a rear pressing member 30 located thereon or formed thereby that is used to cut the continuous strip 14 of the metal sheet. The lower die shoe 24 includes a lower die shoe cutting surface 28 that includes a rear blank cutter 33 located thereon or formed thereby that can receive the rear pressing member 30 during the blanking process. The second blanking die 20 also includes an upper die shoe 32 and a lower die shoe 34. The upper die shoe 32 includes an upper die shoe cutting surface 36 with a front pressing member 40 located thereon or formed thereby that is used to cut the continuous strip 14 of the metal sheet. The lower die shoe 24 includes a lower die shoe cutting surface 42 that includes a front blank cutter 44 located thereon or formed thereby that can receive the front pressing member 40 during the blanking process.

Referring to FIG. 2, the delivery mechanism 12 delivers the continuous strip 14 of the metal sheet to the first blanking die 18 and the second blanking die 20. The second blanking die 20 is a predetermined distance D from the first blanking die 18 in order to set a length in the feed direction of a blank 46 that is formed between the first and second blanking dies 18 and 20. An end 48 of the continuous strip 14 of the metal sheet is fed past the front pressing member 40 another predetermined distance in order to set a width of another blank 50 that is formed downstream from the blank 46. Once the continuous strip 14 of the metal sheet is in position, the upper die shoes 22 and 32 are lowered using, for example, an actuator 52, such as a pneumatic actuator, gas spring, etc. The blank 46 may then be ejected between the first and second blanking dies 18 and 20 on a ramp 54 that delivers the blank 46 in a cross-feed direction and another ramp 51 that delivers the blank 50 in the feed direction.

Figure 3:
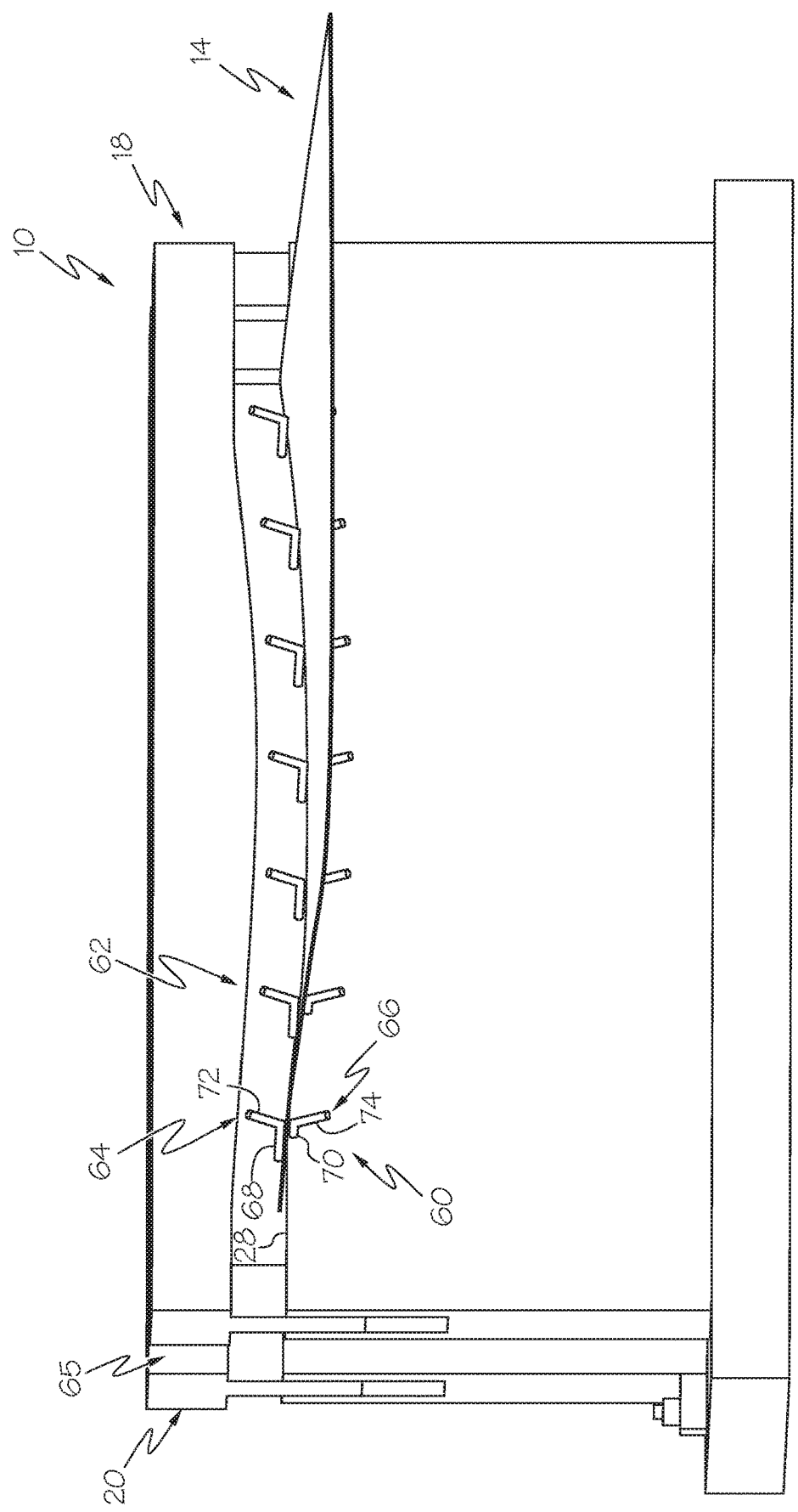
FIG. 3 is a side perspective view of a blanking die apparatus, according to one or more embodiments shown and described herein.
Figure 4:
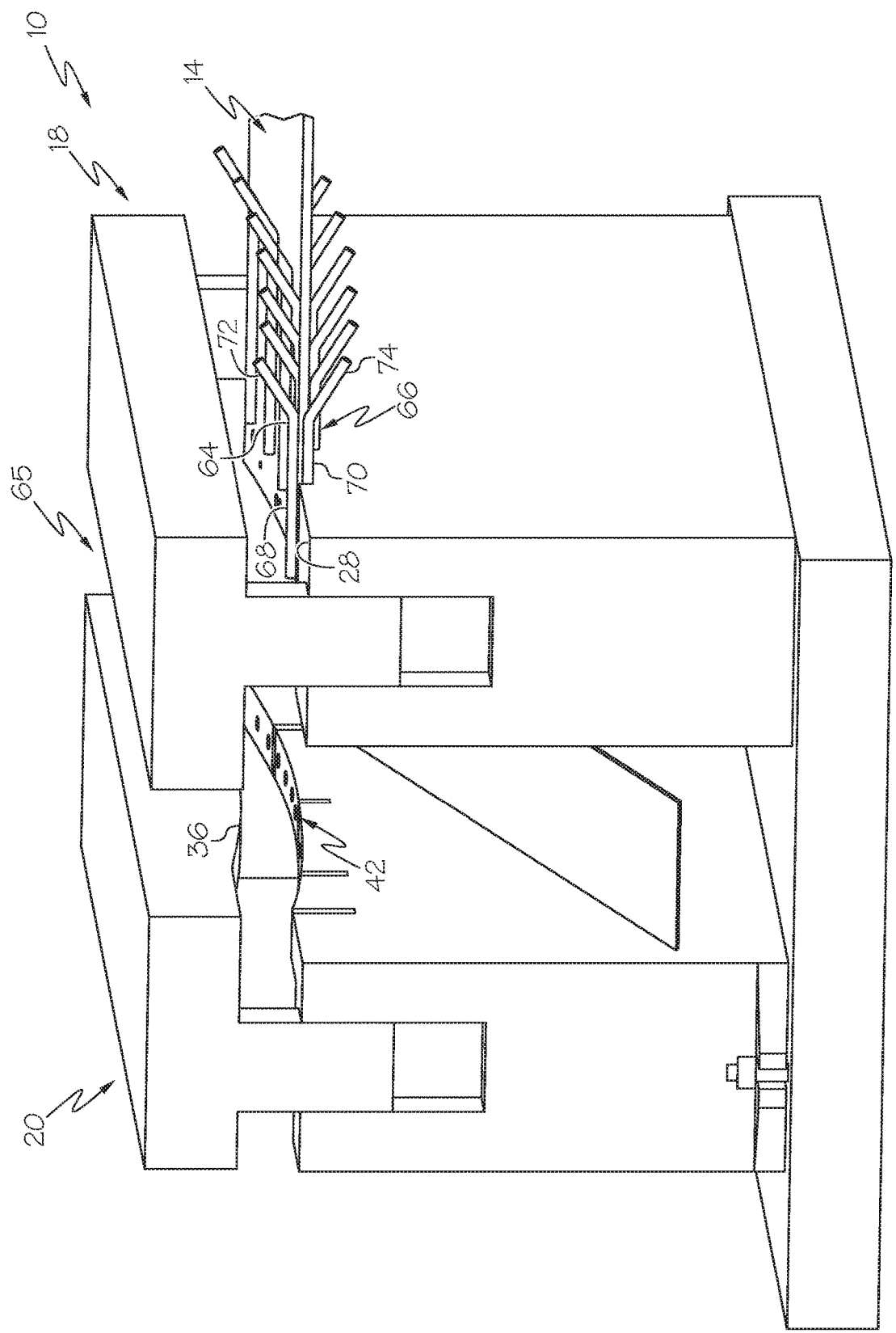
FIG. 4 is another side view of the blanking die apparatus of FIG. 3, according to one or more embodiments shown and described herein.

Referring now to FIGS. 3 and 4, the first blanking die 18 includes an infeed assembly 60 that forms the continuous strip 14 of the metal sheet into a non-planar arc-shape in cross-section to provide added vertical support and resistance to bending for the continuous strip 14 of the metal sheet as it passes over the gap 65 between the first and second blanking dies 18 and 20. The radius of curvature of the infeed assembly 60 is large enough to not impart a permanent bend (i.e., plastic deformation) in the continuous strip 14 of the metal sheet.

The infeed assembly 60 is formed of multiple shaping members 62 that extend along the lower die shoe cutting surface 28 and extend outwardly upstream in the feed direction therefrom. Each shaping member 62 includes an upper finger 64 and a lower finger 66. The upper finger 64 and lower finger 66 have horizontal portions 68 and 70 that extend generally horizontally in the feed directions and angled portions 72 and 74 that extend vertically at an angle to horizontal. The angled portions 72 and 74 extend vertically in opposite direction to provide a lead-in feature that receives the end 48 of the continuous strip 14 of the metal sheet. The horizontal portions 68 and 70 are spaced to provide a gap through which the continuous strip 14 of the metal sheet passes. The gaps are arranged in the desired arc-shape for the continuous strip 14 of the metal sheet. In some embodiments, such as the one shown, the lower die shoe, itself, may provide a support frame for the shaping members 62. In other embodiments, the infeed assembly 60 may include its own support frame for the shaping members 62. The shaping members 62 may be formed of any suitable material, such as nylon, polyoxymethylene, or other plastic material.

The lower die shoe cutting surface 28 may also have an arc-shape having a radius of curvature that matches the radius of curvature of the infeed assembly 60. In some embodiments, the shaping members 62 are supported on the lower die shoe cutting surface 28 to impart the same arced pattern to the shaping members 62 as the lower die shoe cutting surface 28. Providing the lower die shoe cutting surface 28 with the same arc shape can help maintain the continuous strip 14 of the metal sheet in the arc shape.

Figure 5:
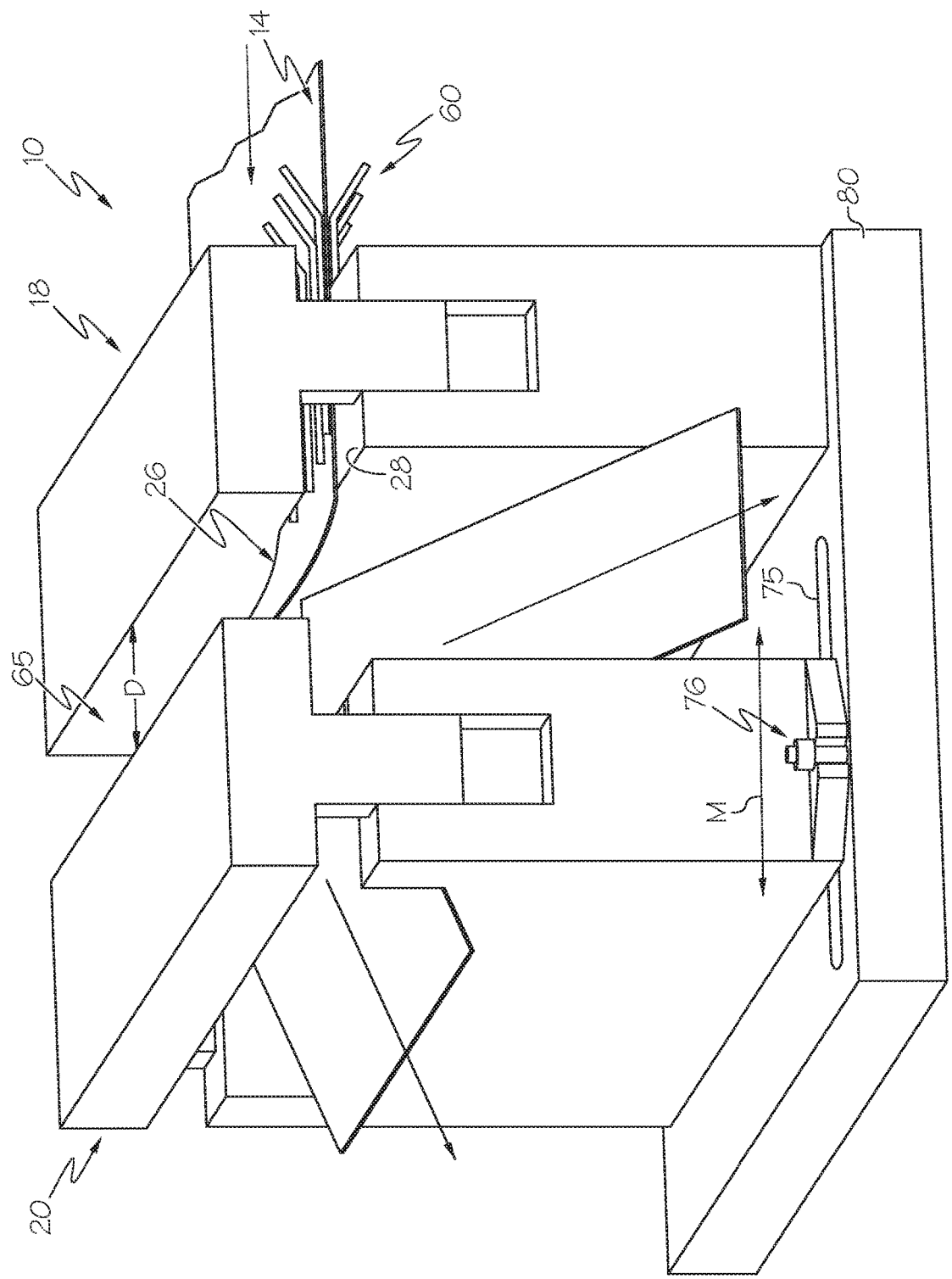
FIG. 5 is another side view of the blanking die apparatus of FIG. 3, according to one or more embodiments shown and described herein.

Referring to FIGS. 4 and 5, the upper die shoe cutting surface 26 may also have an arc-shape having a radius of curvature that matches the radius of curvature of the infeed assembly 60. Providing the upper die shoe cutting surface 26 with substantially the same radius of curvature as the lower die shoe cutting surface 28 can allow for more effective cutting of the continuous strip 14 of the sheet metal by not forcing the continuous sheet flat during cutting.

The lower die shoe cutting surface 42 of the second blanking die 20 may also have an arc-shape having a radius of curvature that matches the radius of curvature of the infeed assembly 60. Providing the lower die shoe cutting surface 42 with the same arc shape can help maintain the continuous strip 14 of the metal sheet in the arc shape as it passes over the gap 65 between the first blanking die 18 and the second blanking die 20.

The upper die shoe cutting surface 36 may also have an arc-shape having a radius of curvature that matches the radius of curvature of the infeed assembly 60. Providing the upper die shoe cutting surface 36 with substantially the same radius of curvature as the lower die shoe cutting surface 42 can allow for more effective cutting of the continuous strip 14 of the sheet metal by not forcing the continuous sheet flat during cutting.

Referring to FIG. 5, the first blanking die 18 and the second blanking die 20 may be connected to a base 80. The first blanking die 18 may be fixedly connected to the base 80, while the second blanking die 20 may be slidably connected to the base 80. For example, the base 80 may include a track 75 in which the second blanking die 20 can be moved toward and away from the first blanking die 18 as represented by arrow M to change the distance D of the gap 65. The second blanking die 20 may be moved manually and/or using an actuator such as a motor, pneumatic actuator, etc. Such a movable arrangement for the second blanking die 20 can allow for a change in length of the blanks. A locking mechanism 76, such as a clamp, screw, etc., may be provided that can lock and release the second blanking die 20 to the base 80 to inhibit its movement relative to the first blanking die 18.

The above-described blanking dies apparatuses include a first blanking die and a second blanking die. The first blanking die may use an infeed assembly that imparts a non-planar, arc-shape to the continuous strip of the sheet metal while it passes between the first blanking die and the second blanking die, which provides vertical support without any use of conveying devices between the first blanking die and the second blanking die. The die shoe cutting surfaces are also provided with the same arc-shape to facilitate transport and cutting of the blanks from the curved continuous strip. Once the blanks are cut, the blanks return to their flat, planar shape at the radius of curvature of the arc is selected to not impart a permanent bend to the continuous strip of sheet metal.

The above-described blanking dies also utilize a base that allows the second blanking die to move toward and away from the first blanking die thereby increasing a distance between the two. Increasing and decreasing the gap between the first blanking die and the second blanking die increases or decreases a length of the resulting blanks.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A blanking die apparatus comprising:
    a first blanking die comprising an upper die shoe including an upper die shoe cutting surface and a lower die shoe including a lower die shoe cutting surface;
    a second blanking die comprising an upper die shoe including an upper die shoe cutting surface and a lower die shoe comprising a lower die shoe cutting surface; and
    an infeed assembly configured to form a continuous strip of a metal sheet into a non-planar, arc-shape in a cross-feed direction as the continuous strip of metal sheet enters the first blanking die;
    wherein the infeed assembly comprises multiple shaping members having gaps located in the arc-shape in the cross-feed direction that receive the continuous strip of the metal sheet, the first and second blanking dies cooperate to cut a first metal blank that travels in the cross-feed direction along a ramp between the first and second blanking dies and a second metal blank that travels along another ramp in a feed direction from the second die.

2. The blanking die apparatus of claim 1, wherein the lower die shoe cutting surface of the first blanking die has an arc-shape.

3. The blanking die apparatus of claim 2, wherein the upper die shoe cutting surface of the first blanking die has an arc-shape that is complementary with the arc-shape of the lower die shoe cutting surface.

4. The blanking die apparatus of claim 3, wherein the lower die shoe cutting surface of the second blanking die has an arc-shape.

5. The blanking die apparatus of claim 4, wherein the upper die shoe cutting surface of the second blanking die has an arc-shape that is complementary with the arc-shape of the lower die shoe cutting surface.

* * * * *